United States Patent
Horn

(10) Patent No.: US 10,013,174 B2
(45) Date of Patent: Jul. 3, 2018

(54) MAPPING SYSTEM SELECTION FOR DATA STORAGE DEVICE

(71) Applicant: Western Digital Technologies, Inc., Irvine, CA (US)

(72) Inventor: Robert Lynn Horn, Yorba Linda, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 50 days.

(21) Appl. No.: 14/871,639

(22) Filed: Sep. 30, 2015

(65) Prior Publication Data

US 2017/0090754 A1    Mar. 30, 2017

(51) Int. Cl.
G06F 3/06    (2006.01)

(52) U.S. Cl.
CPC .............. *G06F 3/061* (2013.01); *G06F 3/064* (2013.01); *G06F 3/0673* (2013.01)

(58) Field of Classification Search
CPC .............................. G06F 3/064; G06F 3/0673
See application file for complete search history.

(56) References Cited

U.S. PATENT DOCUMENTS

| | | |
|---|---|---|
| 6,856,556 B1 | 2/2005 | Hajeck |
| 7,126,857 B2 | 10/2006 | Hajeck |
| 7,430,136 B2 | 9/2008 | Merry, Jr. et al. |
| 7,447,807 B1 | 11/2008 | Merry et al. |
| 7,502,256 B2 | 3/2009 | Merry, Jr. et al. |
| 7,509,441 B1 | 3/2009 | Merry et al. |
| 7,596,643 B2 | 9/2009 | Merry, Jr. et al. |
| 7,606,934 B1 | 10/2009 | Vengerov et al. |
| 7,653,778 B2 | 1/2010 | Merry, Jr. et al. |
| 7,685,337 B2 | 3/2010 | Merry, Jr. et al. |
| 7,685,338 B2 | 3/2010 | Merry, Jr. et al. |
| 7,685,374 B2 | 3/2010 | Diggs et al. |
| 7,733,712 B1 | 6/2010 | Walston et al. |
| 7,765,373 B1 | 7/2010 | Merry et al. |
| 7,898,855 B2 | 3/2011 | Merry, Jr. et al. |
| 7,912,991 B1 | 3/2011 | Merry et al. |
| 7,936,603 B2 | 5/2011 | Merry, Jr. et al. |
| 7,962,792 B2 | 6/2011 | Diggs et al. |
| 8,078,918 B2 | 12/2011 | Diggs et al. |
| 8,090,899 B1 | 1/2012 | Syu |
| 8,095,851 B2 | 1/2012 | Diggs et al. |
| 8,108,692 B1 | 1/2012 | Merry et al. |
| 8,122,185 B2 | 2/2012 | Merry, Jr. et al. |

(Continued)

OTHER PUBLICATIONS

Yoon et al. "The Dynamic granularity memory System", 2012.*
Srinivas Neppalli, et al., U.S. Appl. No. 14/322,064, filed Jul. 2, 2014, 25 pages.

*Primary Examiner* — Tracy Chan
(74) *Attorney, Agent, or Firm* — Barry IP Law

(57) ABSTRACT

A plurality of mapping systems are maintained for mapping logical addresses for data stored in a Data Storage Device (DSD) to physical addresses for locations in at least one memory of the DSD that store the data. Data is received from a host for storage in the at least one memory, and the received data is stored in a location in the at least one memory. A mapping system is selected from the plurality of mapping systems for mapping the received data based on information provided by the host for the received data or based on information determined by the controller for the received data.

22 Claims, 8 Drawing Sheets

(56) References Cited

U.S. PATENT DOCUMENTS

| | | |
|---|---|---|
| 8,127,048 B1 | 2/2012 | Merry et al. |
| 8,135,903 B1 | 3/2012 | Kan |
| 8,151,020 B2 | 4/2012 | Merry, Jr. et al. |
| 8,161,227 B1 | 4/2012 | Diggs et al. |
| 8,166,245 B2 | 4/2012 | Diggs et al. |
| 8,243,525 B1 | 8/2012 | Kan |
| 8,254,172 B1 | 8/2012 | Kan |
| 8,261,012 B2 | 9/2012 | Kan |
| 8,296,625 B2 | 10/2012 | Diggs et al. |
| 8,312,207 B2 | 11/2012 | Merry, Jr. et al. |
| 8,316,176 B1 | 11/2012 | Phan et al. |
| 8,341,339 B1 | 12/2012 | Boyle et al. |
| 8,341,340 B2 | 12/2012 | Rub |
| 8,375,151 B1 | 2/2013 | Kan |
| 8,392,635 B2 | 3/2013 | Booth et al. |
| 8,397,107 B1 | 3/2013 | Syu et al. |
| 8,407,449 B1 | 3/2013 | Colon et al. |
| 8,423,722 B1 | 4/2013 | Deforest et al. |
| 8,433,858 B1 | 4/2013 | Diggs et al. |
| 8,443,167 B1 * | 5/2013 | Fallone ............... G06F 12/0246 711/206 |
| 8,447,920 B1 | 5/2013 | Syu |
| 8,458,435 B1 | 6/2013 | Rainey, III et al. |
| 8,478,930 B1 | 7/2013 | Syu |
| 8,489,854 B1 | 7/2013 | Colon et al. |
| 8,503,237 B1 | 8/2013 | Horn |
| 8,521,972 B1 | 8/2013 | Boyle et al. |
| 8,549,236 B2 | 10/2013 | Diggs et al. |
| 8,583,835 B1 | 11/2013 | Kan |
| 8,601,311 B2 | 12/2013 | Horn |
| 8,601,313 B1 | 12/2013 | Horn |
| 8,612,669 B1 | 12/2013 | Syu et al. |
| 8,612,804 B1 | 12/2013 | Kang et al. |
| 8,615,681 B2 | 12/2013 | Horn |
| 8,638,602 B1 | 1/2014 | Horn |
| 8,639,872 B1 | 1/2014 | Boyle et al. |
| 8,683,113 B2 | 3/2014 | Abasto et al. |
| 8,700,834 B2 | 4/2014 | Horn et al. |
| 8,700,950 B1 | 4/2014 | Syu |
| 8,700,951 B1 | 4/2014 | Call et al. |
| 8,706,985 B1 | 4/2014 | Boyle et al. |
| 8,707,104 B1 | 4/2014 | Jean |
| 8,713,066 B1 | 4/2014 | Lo et al. |
| 8,713,357 B1 | 4/2014 | Jean et al. |
| 8,719,531 B2 | 5/2014 | Strange et al. |
| 8,724,422 B1 | 5/2014 | Agness et al. |
| 8,725,931 B1 | 5/2014 | Kang |
| 8,745,277 B2 | 6/2014 | Kan |
| 8,751,728 B1 | 6/2014 | Syu et al. |
| 8,769,190 B1 | 7/2014 | Syu et al. |
| 8,769,232 B2 | 7/2014 | Suryabudi et al. |
| 8,775,720 B1 | 7/2014 | Meyer et al. |
| 8,782,327 B1 | 7/2014 | Kang et al. |
| 8,788,778 B1 | 7/2014 | Boyle |
| 8,788,779 B1 | 7/2014 | Horn |
| 8,788,880 B1 | 7/2014 | Gosla et al. |
| 8,793,429 B1 | 7/2014 | Call et al. |
| 8,977,803 B2 | 3/2015 | Horn et al. |
| 2006/0041719 A1 | 2/2006 | Chui et al. |
| 2006/0161724 A1 | 7/2006 | Bennett et al. |
| 2007/0288692 A1 | 12/2007 | Bruce et al. |
| 2009/0144501 A2 | 6/2009 | Yim et al. |
| 2010/0174849 A1 | 7/2010 | Walston et al. |
| 2010/0250793 A1 | 9/2010 | Syu |
| 2011/0099323 A1 | 4/2011 | Syu |
| 2011/0283049 A1 | 11/2011 | Kang et al. |
| 2012/0260020 A1 | 10/2012 | Suryabudi et al. |
| 2012/0272038 A1 | 10/2012 | Wei et al. |
| 2012/0278531 A1 | 11/2012 | Horn |
| 2012/0284460 A1 | 11/2012 | Guda |
| 2012/0324191 A1 | 12/2012 | Strange et al. |
| 2013/0132638 A1 | 5/2013 | Horn et al. |
| 2013/0145106 A1 | 6/2013 | Kan |
| 2013/0290793 A1 | 10/2013 | Booth et al. |
| 2014/0059405 A1 | 2/2014 | Syu et al. |
| 2014/0101369 A1 | 4/2014 | Tomlin et al. |
| 2014/0115427 A1 | 4/2014 | Lu |
| 2014/0133220 A1 | 5/2014 | Danilak et al. |
| 2014/0136753 A1 | 5/2014 | Tomlin et al. |
| 2014/0149826 A1 | 5/2014 | Lu et al. |
| 2014/0157078 A1 | 6/2014 | Danilak et al. |
| 2014/0181432 A1 | 6/2014 | Horn |
| 2014/0223255 A1 | 8/2014 | Lu et al. |
| 2015/0120995 A1 * | 4/2015 | Hasfar ............... G06F 3/0632 711/104 |
| 2017/0060475 A1 * | 3/2017 | Lee ............... G06F 3/0653 |

* cited by examiner

| LBA | Priority | Startup | Expected Frequency |
|---|---|---|---|
| 0 | 1 | 1 | 0 |
| 1 | 0 | 0 | 2 |
| 2 | 0 | 0 | 1 |
| ⋮ | ⋮ | ⋮ | ⋮ |
| N | 1 | 0 | 0 |

FIG. 4

| LBA | Accessed | Startup Proximity | Frequency | Sequential |
|---|---|---|---|---|
| 0 | 8/10/15 4:18:27 | 1 | 2 | 0 |
| 1 | 8/8/15 2:31:14 | 0 | 2 | 0 |
| 2 | 5/6/15 12:45:11 | 0 | 1 | 0 |
| ⋮ | ⋮ | ⋮ | ⋮ | ⋮ |
| N | 3/7/13 15:23:18 | 0 | 0 | 1 |

FIG. 5

MAPPING SYSTEM SELECTION FOR DATA STORAGE DEVICE

BACKGROUND

Data Storage Devices (DSDs) are often used to record data onto or to reproduce data from a storage media such as a rotating magnetic disk or a solid-state memory. A host may use the DSD to store data or to retrieve data from the DSD using write commands or read commands issued to the DSD. The write commands and read commands typically include a logical address for the data. The DSD will often maintain a mapping system that maps the logical addresses used by the host to physical addresses indicating a location where the data stored or to be stored.

The size of the mapping system generally increases with the amount of data that can be stored in the DSD. The amount of overhead associated with maintaining the mapping system may also increase, which can affect performance of the DSD by consuming more processing or memory resources. This increased overhead can become noticeable, for example, during a startup period when the DSD may need to restore the mapping system. In addition, some types of storage media such as flash memory or Shingled Magnetic Recording (SMR) may use address indirection, which can further increase the amount of overhead required to maintain the mapping system.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

FIG. 4 is an example of host information used to select a mapping system according to an embodiment.

FIG. 5 is an example of learned information used to select a mapping system according to an embodiment.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

System Overview

Figure 1:
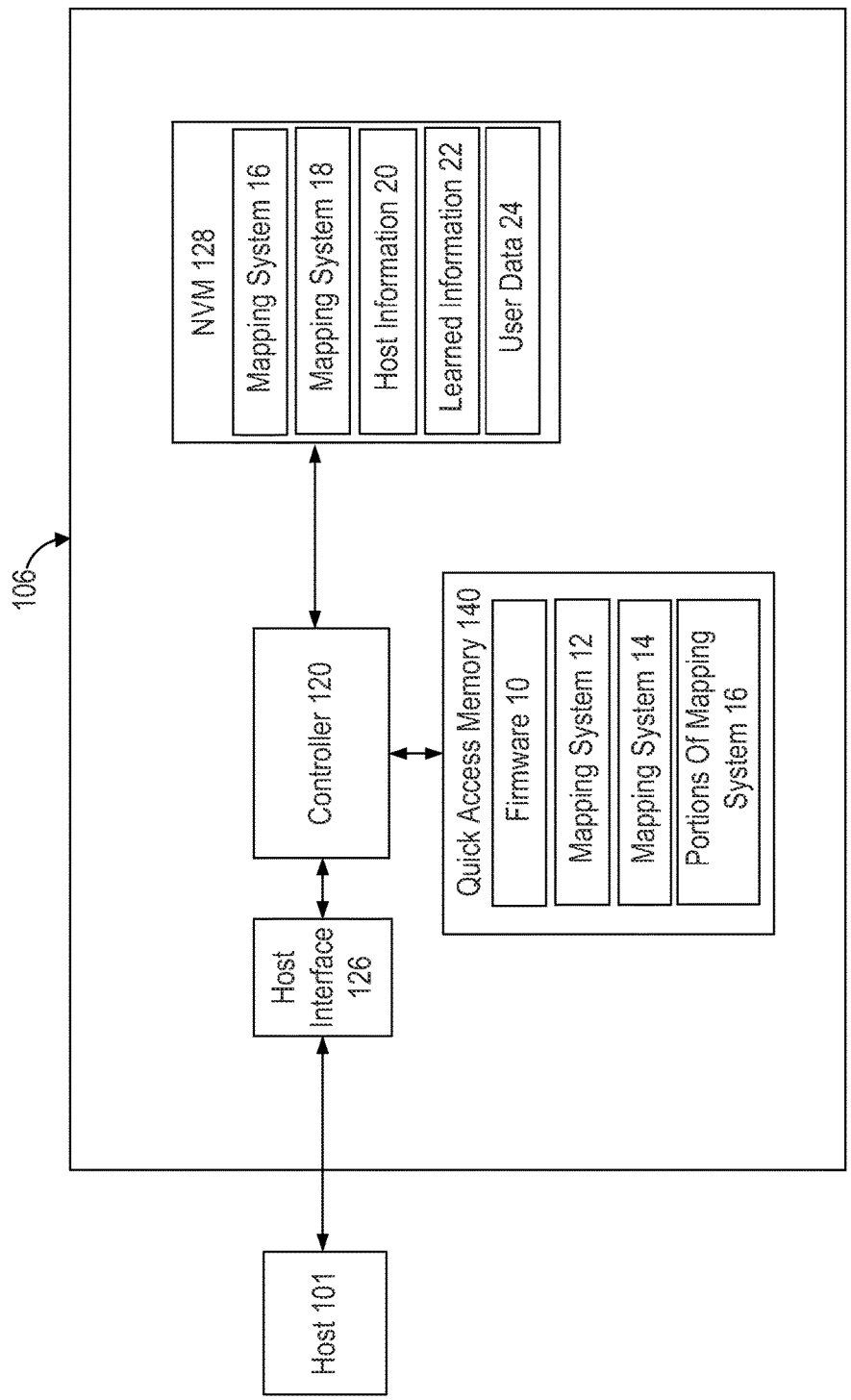
FIG. 1 is a block diagram depicting a Data Storage Device (DSD) according to an embodiment.

FIG. 1 shows an example of Data Storage Device (DSD) 106 which communicates with host 101 according to an embodiment. Host 101 and DSD 106 may form a system, such as a computer system (e.g., server, desktop, mobile/laptop, tablet, smartphone, etc.) or other electronic device such as a Digital Video Recorder (DVR). The components of FIG. 1 may or may not be physically co-located. In this regard, host 101 may be located remotely from DSD 106. Those of ordinary skill in the art will also appreciate that other embodiments can include more or less than those elements shown in FIG. 1 and that the disclosed processes can be implemented in other environments. For example, other embodiments can include a different number of hosts communicating with DSD 106.

As shown in the example embodiment of FIG. 1, DSD 106 includes Non-Volatile Memory (NVM) 128 for storing data across power cycles. NVM 128 can include non-volatile storage media such as a rotating magnetic disk, magnetic tape, or a non-volatile, solid-state memory.

While the description herein refers to solid-state memory generally, it is understood that solid-state memory may comprise one or more of various types of memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistive RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM chips, or any combination thereof.

DSD 106 also includes a quick access memory 140 that generally allows data to be accessed faster than from NVM 128. Memory 140 can, for example, include a volatile memory such as (Dynamic Random Access Memory) DRAM or an NVM such as a solid-state memory, such as MRAM.

As shown in FIG. 1, DSD 106 includes controller 120 which includes circuitry such as one or more processors for executing instructions and can include a microcontroller, a Digital Signal Processor (DSP), an Application-Specific Integrated Circuit (ASIC), a Field Programmable Gate Array (FPGA), hard-wired logic, analog circuitry and/or a combination thereof. In one implementation, controller 120 can include a System On a Chip (SoC).

Host interface 126 is configured to interface DSD 106 with host 101, and may interface using, for example, Ethernet or WiFi, or a bus standard such as Serial Advanced Technology Attachment (SATA), PCI express (PCIe), Small Computer System Interface (SCSI), or Serial Attached SCSI (SAS). As will be appreciated by those of ordinary skill in the art, host interface 126 can be included as part of controller 120.

In operation, host 101 stores data in DSD 106 by sending a write command to DSD 106 specifying one or more logical addresses (e.g., Logical Block Addresses (LBAs)) associated with the data. Host interface 126 receives the write command and controller 120 determines a location in a memory of DSD 106 (e.g., NVM 128 or memory 140) for storing the data. Controller 120 updates a mapping system (e.g., mapping system 12, 14, 16 or 18) to map the logical addresses associated with the data to physical addresses of the memory location storing the data.

Host 101 retrieves data from DSD 106 by sending a read command specifying one or more logical addresses associated with the data to be retrieved from DSD 106. Host interface 126 receives the read command and controller 120 uses a mapping system to translate the logical addresses of the read command to the physical addresses indicating the location of the data. Controller 120 then reads the requested data from the memory location specified by the physical addresses and returns the read data to host 101 via interface 126.

As discussed in more detail below, the present disclosure allows for multiple mapping systems that are better tailored to the data, the memory storing the data, and/or the use of the data. Information provided by host 101 (e.g., host information 20) and/or information determined by controller 120 (e.g., learned information 22) is used to select a particular mapping system that may be best suited to the data, how the data is used, and/or where the data is stored. This can ordinarily allow for the selection of a mapping system that improves the performance of DSD 106 in accessing data or reduces the amount of resources needed to map the data.

As shown in FIG. 1, NVM 128 stores user data 24, host information 20, learned information 22, and mapping systems 16 and 18. User data 24 includes data that has been received from host 101 for storage in DSD 106. Although user data 24 is only shown in NVM 128, both NVM 128 and memory 140 can store user data in other embodiments.

Host information 20 includes information provided by host 101 about data stored in DSD 106 that can be used by controller 120 to select a mapping system. Some examples of host information 20 can include a priority level for the data, an indication of whether the data is used during a startup period of host 101, or an indication of how frequently the data is expected to be accessed. Host information 20 is discussed in more detail below with reference to the example of FIG. 4.

Learned information 22 includes information that is learned or determined by controller 120 and that can be used by controller 120 to select a mapping system. Some examples of learned information 22 can include when the data was last accessed, how frequently the data has been accessed, or whether the data has been used during or soon after a startup period of host 101 or DSD 106. Learned information 22 is discussed in more detail below with reference to FIG. 5.

By collecting host information 20 or learned information 22 at DSD 106, controller 120 can use this information to select a mapping system that is better suited to the data, the memory storing the data, and/or how the data is accessed.

In one implementation, mapping systems 16 and 18 provide two different granularities in mapping logical addresses to physical addresses to better suit a smallest unit size of a memory storing the data. As discussed in more detail below with reference to the example of mapping system 18 in FIG. 3, mapping system 18 can provide a lower granularity so that a larger number of logical addresses are grouped together in mapping to one or more physical addresses.

Controller 120 may also select a lower granularity mapping system, for example, for data that is usually accessed by a single read command from host 101. By using a mapping system with a lower granularity, it is ordinarily possible to reduce the amount of space needed to store the mapping system and allow for fewer references to the mapping system to access the data. A lower granularity can also allow for a lower overhead when updating the mapping system to account for changes in the data.

Memory 140 stores firmware 10, mapping system 12, mapping system 14, and portions of mapping system 16. In addition, memory 140 may also temporarily store data read from NVM 128, data to be stored in NVM 128, instructions loaded from firmware 10 for execution by controller 120, and/or data used in executing firmware 10. In this regard, firmware 10 can include computer-executable instructions for controlling operation of DSD 106.

In one implementation, mapping system 12 provides a mapping system for data that is accessed during a startup period or soon after a startup period. An example of mapping system 12 that is used for data accessed during or soon after startup is discussed below with reference to FIG. 2.

Mapping system 14 can include a mapping system with a fastest lookup time that can, for example, be used for mapping high priority data or data that is frequently accessed. The lookup time can include an average amount of time it takes controller 120 to translate a logical address in mapping system 14 to a physical address. The faster lookup time of mapping system 14 may be attributed to factors such as being stored in memory 140, which can generally be accessed quicker than NVM 128, and/or a low number of memory references needed to perform a mapping operation such as translation. For example, mapping system 16 may use a b-tree data structure that requires several references to the data structure before finding a particular logical address. Mapping system 14, on the other hand, may use a hash function to calculate an index for a particular logical address to allow for only one memory reference to translate the logical address.

The portions of mapping system 16 that are stored in memory 140 can provide redundancy and/or a faster access to the mapping for certain data. These portions of mapping system 16 can be used to map data that may have, for example, a higher priority than other data mapped by mapping system 16 or that is more frequently or recently accessed than other data mapped by mapping system 16. In other embodiments, portions of mapping system 18 may also be stored in memory 140.

Figure 2:
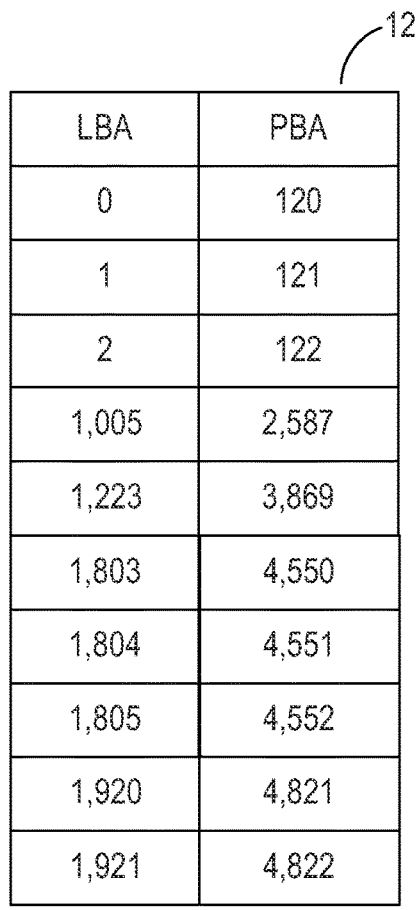
FIG. 2 depicts an example of a mapping system for data used during or soon after a startup period according to an embodiment.

FIG. 2 shows an example of a mapping system 12 according to an embodiment where mapping system 12 is used to map data accessed during or soon after a startup period. As shown in FIG. 2, mapping system 12 includes entries for data stored in a memory of DSD 106 (e.g., NVM 128 or memory 140). Each entry includes an LBA for the data and a corresponding Physical Block Address indicating a location where the data is stored.

Mapping system 12 may be available sooner than other mapping systems due to the storage media used to store mapping system 12 and/or a size of mapping system 12. In an implementation where memory 140 is a volatile DRAM, a smaller size of mapping system 12 can allow for mapping system 12 to be loaded from a non-volatile location into memory 140 faster than other mapping systems.

In one example, mapping system 12 may be limited to a predetermined size or may be smaller than other mapping systems due to the smaller amount of data accessed during or soon after the startup period. In some implementations, mapping system 12 can be limited to only the logical addresses that are requested by host 101 during a startup period of host 101 when host 101 boots its operating system. In other implementations, mapping system 12 may also include entries or logical addresses for data that is requested or written to within a predetermined period of time following the startup period. Using mapping system 12 for such data can reduce the startup time or a perceived startup time of a system including host 101 and DSD 106.

In some implementations, host 101 may provide DSD 106 with logical addresses that are accessed during the startup period or indicate a range of logical addresses that is used for data accessed during the startup period. Controller 120 may use this information as part of host information 20 to identify the logical addresses of data accessed during startup. In other implementations, controller 120 may keep track of the logical addresses that are requested or written by host 101 during one or more startup periods. This information may be stored by controller 120 in learned information 22.

Figure 3:
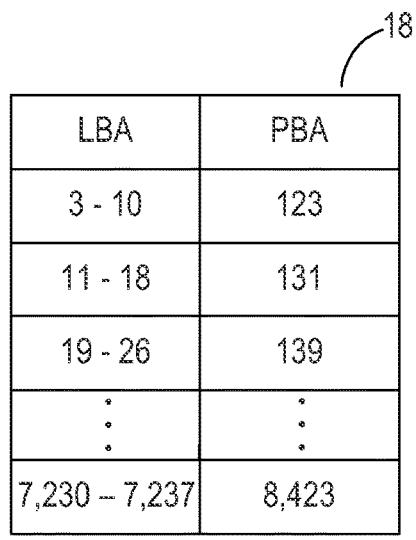
FIG. 3 depicts an example of a mapping system with a larger granularity according to an embodiment.

FIG. 3 depicts an example of mapping system 18 according to an embodiment where mapping system 18 provides a lower granularity of logical addresses than other mapping systems. As noted above, a mapping system with a lower granularity can provide for an increased performance in accessing data or a lower amount of space and overhead in maintaining the mapping system. As shown in FIG. 3, each row or entry of mapping system 18 covers a range of LBAs that correspond to a starting Physical Block Address (PBA) or a range of PBAs.

In some implementations, mapping system 18 can be used to map data that is stored in a memory having a smallest unit size for storing data that is larger than the size of data associated with a single logical address of host 101. For example, NVM 128 may include a rotating magnetic disk with sectors that can store 4,096 bytes of data while host 101 may use LBAs of 512 bytes. The data stored in the larger sectors can then be mapped using a lower granularity of mapping system 18. In another example, NVM 128 can include a flash memory with a page size of 4,096 bytes of data while host 101 may use LBAs of 512 bytes.

Controller 120 may use host information 20 and/or learned information 22 to determine which data should be mapped with the low granularity of mapping system 18. In one example, data that is typically accessed sequentially in blocks equal to or larger than a smallest unit size of a memory can be mapped by mapping system 18 since the larger blocks cover the larger range of LBAs provided for a given entry in mapping system 18.

FIG. 4 is an example of host information 20 used to select a mapping system according to an embodiment. As shown in the example of FIG. 4, host information 20 can reference the data by its LBA and include a priority of the data, an indication of whether the data is used during startup, and an expected frequency of access of the data. Other embodiments may include different information in host information 20.

Host 101 may provide host information 20, for example, by using a particular range of LBAs for certain categories of data or by indicating a value for the information. For example, host 101 may use a particular range of LBAs for data that is used during a startup period, that has a higher priority, or that is expected to be accessed more frequently.

Host 101 may alternatively use an indication such as a value to indicate a higher priority, access of the data during a startup period, or an expected frequent access of the data. The indication may be sent as part of the write command when storing the data or as part of a separate Vendor Specific Command (VSC). The information provided by host 101 can then be used to update host information 20 and select a mapping system for mapping a logical address (e.g., LBA) for the data to a physical address (e.g., PBA).

FIG. 5 is an example of learned information 22 used to select a mapping system according to an embodiment. As shown in the example of FIG. 5, learned information 22 can reference the data by its LBA and include a last time the data was accessed, a temporal proximity to a startup period, a learned frequency of access of the data, and whether the data is sequentially accessed in blocks larger than a predetermined size. The information in learned information 22 can be determined by controller 120 after the data has been stored in the DSD for a certain period of time and updated as the information changes for the data. Other embodiments may include different information in learned information 22.

The time that the data was last accessed may be used, for example, in determining whether certain data should be remapped with a different mapping system. In one example, data that has been accessed within a certain time period can be remapped to a different mapping system to provide for a quicker access to the data if accessed again. In some implementations, controller 120 may consider multiple factors when determining whether to remap data with a different mapping system. For example, controller 120 may consider both the frequency at which the data has been accessed and the time since the data was last accessed.

Example Mapping System Processes

Figure 6:
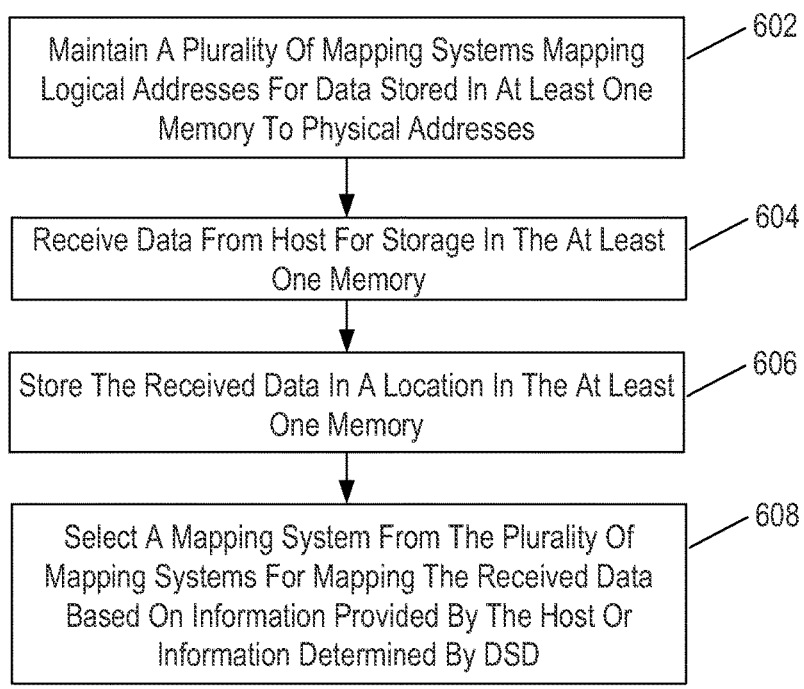
FIG. 6 is a flowchart for a mapping system selection process according to an embodiment.

FIG. 6 is a flowchart for a mapping system selection process according to an embodiment. The process of FIG. 6 can be performed by controller 120 executing firmware 10.

In block 602, a plurality of mapping systems are maintained that map logical addresses for data stored in at least one memory of DSD 106 to physical addresses indicating a location where the data is stored in the at least one memory. As discussed above, the mapping systems can have different characteristics such as different granularities, sizes, methods of access, or lookup times.

In block 604, controller 120 receives data from host 101 for storage in the at least one memory of DSD 106. The data can be received as part of a write command that includes the data to be stored, one or more logical addresses for the data, and optional information relating to the data that can be used by controller 120 as host information 20.

In block 606, controller 120 stores the received data in a location in the at least one memory. In the example of FIG. 1, the received data can be stored as user data 24 in NVM 128. Controller 120 may also store any additional information provided from host 101 as host information 20.

In block 608, controller 120 selects a mapping system for the received data from multiple mapping systems based on host information 20 and/or learned information 22. In selecting a mapping system, controller 120 may consider one or more factors such as a priority of the data, whether the data is used during or soon after a startup period, an expected frequency of access of the data, or the size of the data. In addition, the factors may have different weights in selecting the mapping system.

Figure 7:
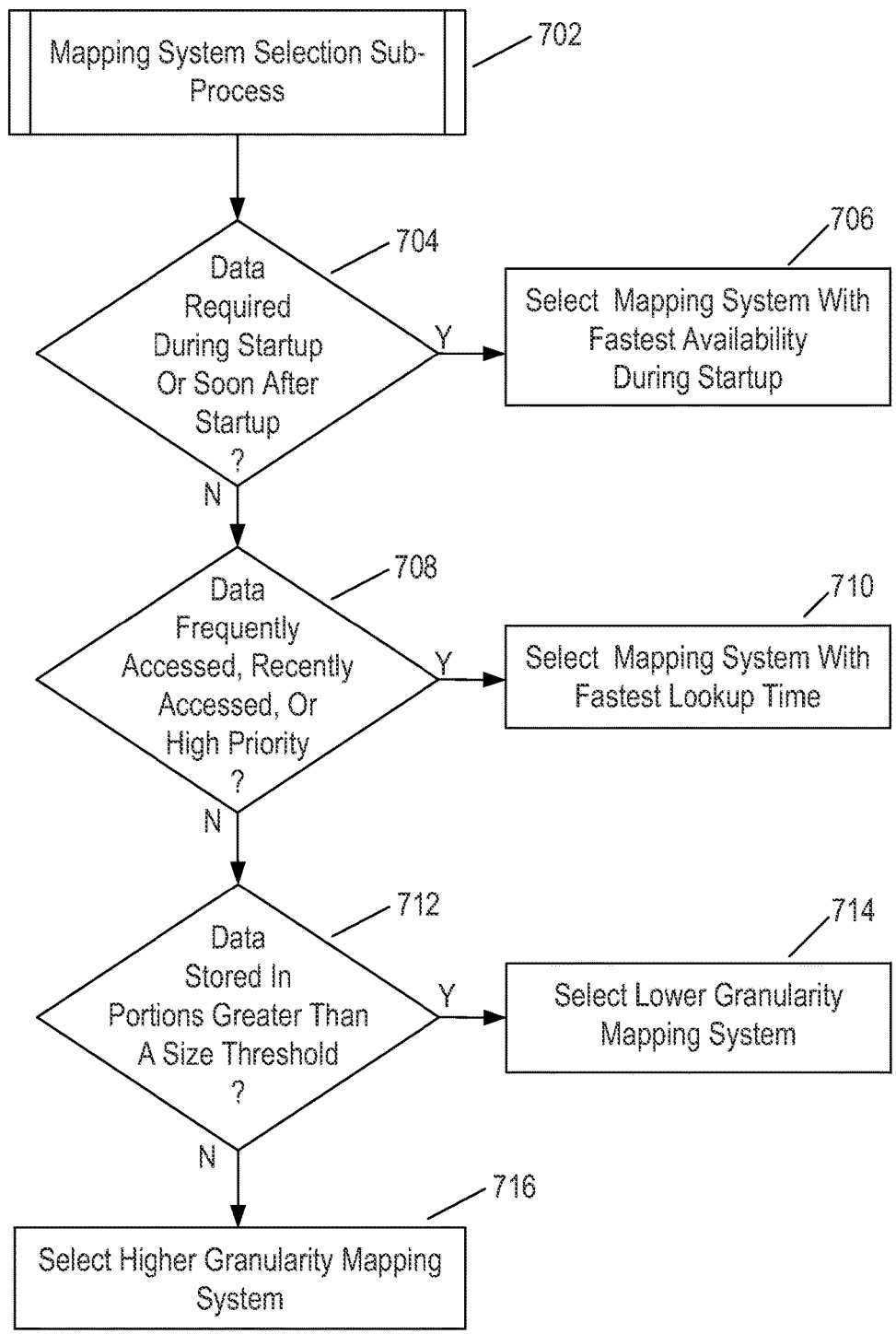
FIG. 7 is a flowchart for a mapping system selection sub-process according to an embodiment.

FIG. 7 is a flowchart for a mapping system selection sub-process that can be performed by controller 120 executing firmware 10 according to an embodiment. The sub-process of FIG. 7 can be performed as part of the selection in block 608 of FIG. 6 discussed above, or as part of a remapping of data based on updated learned information 22 or updated host information 20.

In block 702, controller 120 initiates the selection sub-process, and in block 704, controller 120 determines whether the data considered for remapping will be required during a startup period or soon after a startup period. The determination in block 704 can be made using host information 20 and/or learned information 22 that indicates that the data will be or has been used during a startup period or within a predetermined period of time from a startup period. In other embodiments, the determination in block 704 may only consider whether the data is required during a startup period, as opposed to soon after a startup period.

If the data is required during or soon after a startup period, controller 120 in block 706 selects a mapping system with a fastest availability during the startup period for mapping the data. As discussed above with reference to the example of mapping system 12 in FIG. 2, the mapping system with the fastest availability during the startup period can be of a limited size or may be loaded into a memory (e.g. memory 140) that is available for accessing data sooner than other memories (e.g., NVM 128).

If the data is not required during or soon after the startup period, controller 120 in block 708 determines whether the data is frequently accessed, recently accessed, or has a high priority. The determination in block 708 can be made using host information 20 and/or learned information 22.

If it is determined that the data meets one or more of the criteria of block 708, controller 120 in block 710 selects a mapping system with a fastest lookup time. As discussed above with reference to the example of mapping system 14, the mapping system with the fastest lookup time can be stored in a memory with a relatively quick access or read time (e.g., memory 140) compared to other memories of DSD 106. The mapping system with the fastest lookup time may also have a data structure or access method that allows for faster translation of logical addresses to physical addresses.

If it is determined that the data does not meet one or more of the criteria of block 708, controller 120 in block 712 determines whether the data is stored in portions greater than a threshold size. The threshold size may correspond to a smallest unit size of a particular memory such as a page size of a flash memory or a sector size of a rotating magnetic disk.

If it is determined in block 712 that the data is stored in portions greater than the threshold size, controller 120 in block 714 selects a mapping system with a lower granularity of logical addresses than other mapping systems. As discussed above with reference to the example of mapping system 18 in FIG. 3, a mapping system with a lower granularity can decrease the size of the mapping system and reduce the overhead needed to maintain the mapping system.

If it is determined in block 712 that the data is not stored in portions greater than the threshold size, controller 120 in block 716 selects a mapping system with a higher granularity (e.g., mapping system 16). This mapping system may also be used as a default mapping system that is stored in a slower access memory (e.g., NVM 128) for data that may not have host information 20 or learned information 22 associated with the data.

As information for the data is determined or collected by controller 120, portions of the default mapping system may be loaded into memory 140 for quicker access of data that may, for example, be accessed more frequently than other data stored in NVM 128 or that may have a higher priority than other data stored in NVM 128.

By selecting a mapping system that is better suited to the data, the memory storing the data, or how the data will be used, it is ordinarily possible to improve the performance of DSD 106 and reduce the amount of memory needed to store mapping information. Other embodiments may include different criteria than those shown in FIG. 7 or may include less than all of the criteria shown in FIG. 7.

Figure 8:
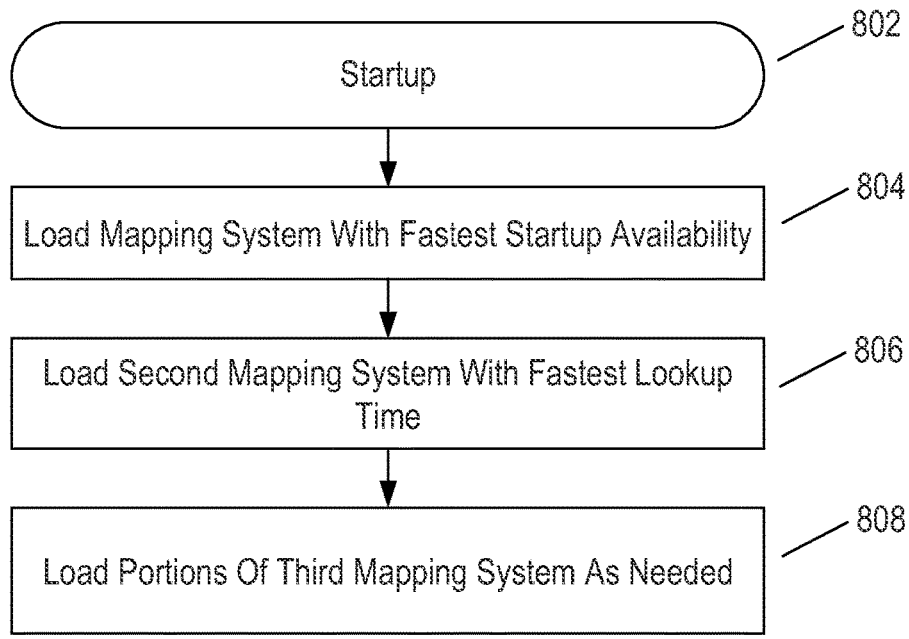
FIG. 8 is a flowchart for a mapping system loading process according to an embodiment.

FIG. 8 is a flowchart for a mapping system loading process that can be performed by controller 120 executing firmware 10 according to an embodiment where memory 140 is a volatile memory such as DRAM. In the example of FIG. 1, each of mapping system 12, mapping system 14, and the portions of mapping system 16 can be loaded into memory 140 in a particular order to improve the performance of DSD 106 in performing read and write commands. Although some of the times when the mapping systems are loaded into memory 140 may overlap, the example embodiment of FIG. 8 provides an order for initiating the loading of the mapping systems to improve the performance of DSD 106.

In block 802, the process of FIG. 8 is initiated during a startup period of host 101 or DSD 106. In one implementation, the process of FIG. 8 may be initiated when DSD 106 receives an initial read command for data stored in DSD 106 that is used to load an operating system of host 101. In other implementations, the process of FIG. 8 may be initiated when DSD 106 receives an indication from host 101 that a startup period has begun or ended.

In block 804, controller 120 loads a mapping system with a fastest availability or restoration time (e.g., mapping system 12) during or following the startup period of host 101. This can ordinarily allow for data that has been mapped by the mapping system to be available for access sooner during or after the startup period than data that is mapped by other mapping systems.

In block 806, controller 120 loads a mapping system with a fastest lookup time (e.g., mapping system 14). This can ordinarily allow for data that may be more frequently accessed to be accessed quicker than other data that is not accessed as frequently and mapped by a different mapping system with a slower lookup time.

In block 808, controller 120 loads portions of a third mapping system (e.g., mapping system 16) that is stored in NVM 128. These portions of the third mapping system can correspond to data that is accessed more frequently or has a higher priority than other data mapped by mapping system 16.

Figure 9:
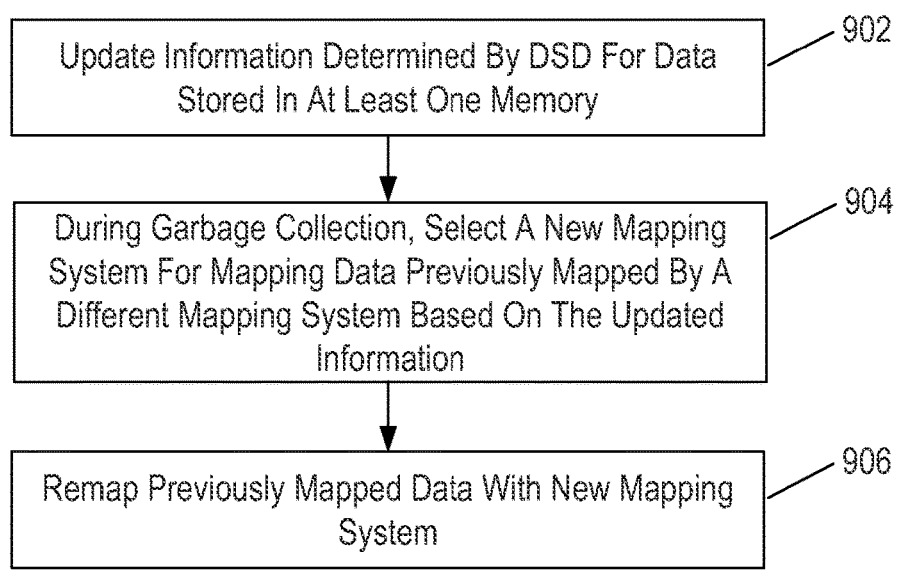
FIG. 9 is a flowchart for a remapping process performed during garbage collection according to an embodiment.

FIG. 9 is a flowchart for a remapping process performed during Garbage Collection (GC) according to an embodiment. The remapping process of FIG. 9 can be performed by controller 120 executing firmware 10.

Controller 120 can perform a GC process to reclaim portions of memory that store invalid data so that the reclaimed portions can store new data. The invalid data can include data that may be obsolete due to the data associated with a logical address being deleted or new data being written for the logical address in a different memory location.

In block 902, controller 120 updates learned information 22 or host information 20. The updating of learned information 22 can take place on a periodic basis, as certain actions are performed, or before performing a garbage collection process. As discussed above, learned information 22 can include observed metrics about the data that can be determined by controller 120 over time. Host information 20 may be updated as new information is received from host 101.

In one example, data that was previously accessed with a relatively high frequency may have been used less over a more recent period of time. Controller 120 may then update learned information 22 to account for a less frequent use of the data. In another example, learned information 22 may be updated to account for data no longer being accessed during or soon after a startup period of host 101. These changes in learned information 22 or host information 20 can be used to remap the data to a more appropriate mapping system.

In block 904, a new mapping system is selected during a GC process for mapping data that was previously mapped by a different mapping system. In selecting the new mapping system, updated learned information 22 and/or updated host information 20 is evaluated for valid data that is left in a portion of the memory being garbage collected. A mapping selection sub-process, such as the example sub-process of FIG. 7, may be used to determine whether a new mapping system should be used for the valid data. In some cases, some or all of the valid data may continue to be mapped by the same mapping system.

In block 906, controller 120 remaps valid data with the new mapping system selected in block 904. The remapped valid data can be remapped with a mapping system that is better suited to the way the data has been more recently used or characterized.

In other embodiments, the remapping of data with a different mapping system may take place as part of a periodic maintenance activity that is not part of a GC process. However, remapping during GC can take advantage of the need to read valid data during GC and to limit the amount of data that is considered for remapping to only the valid data that will be kept following GC.

Figure 10A:
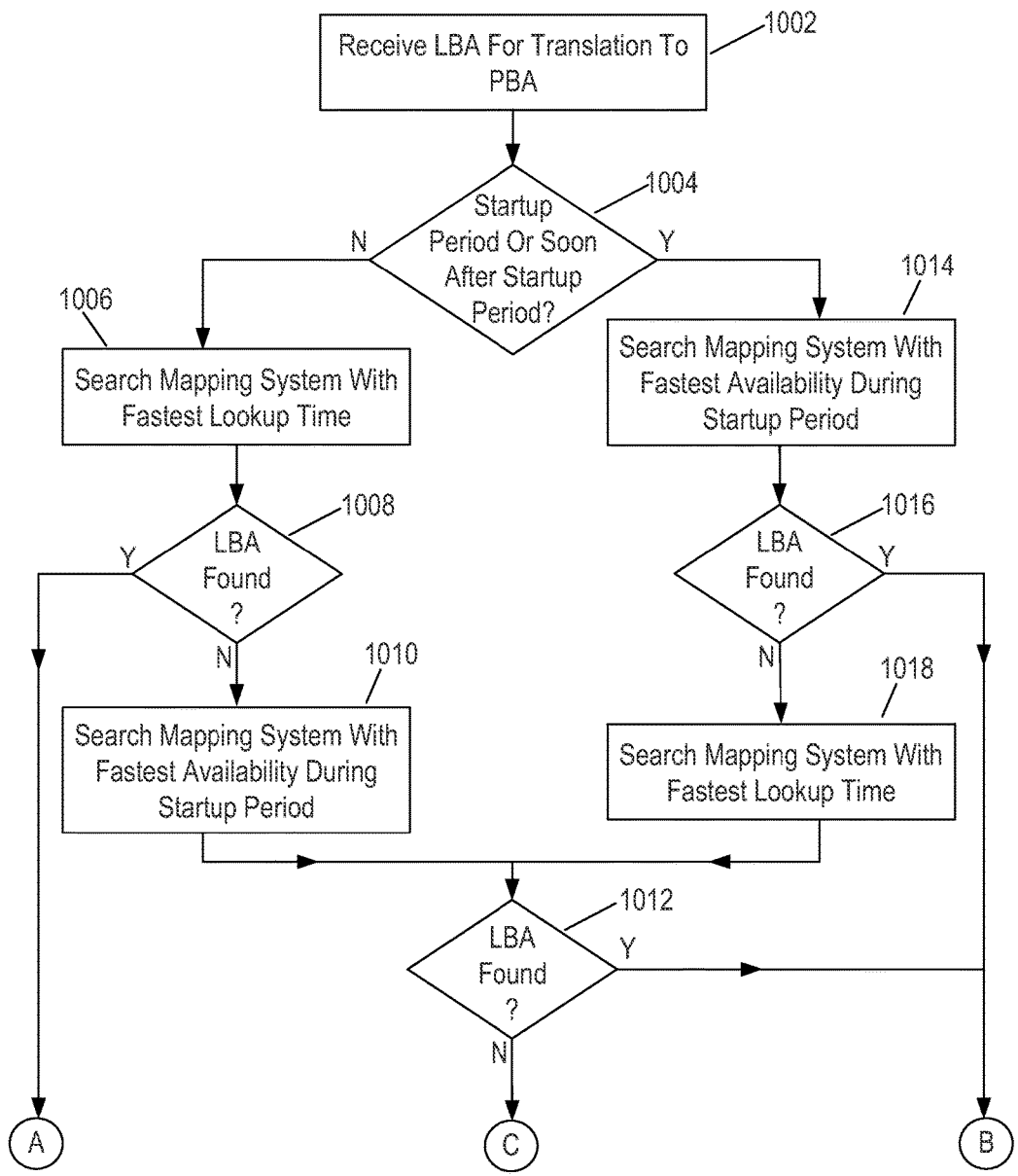
FIG. 10A is a first part of a flowchart for an address translation process according to an embodiment.
Figure 10B:
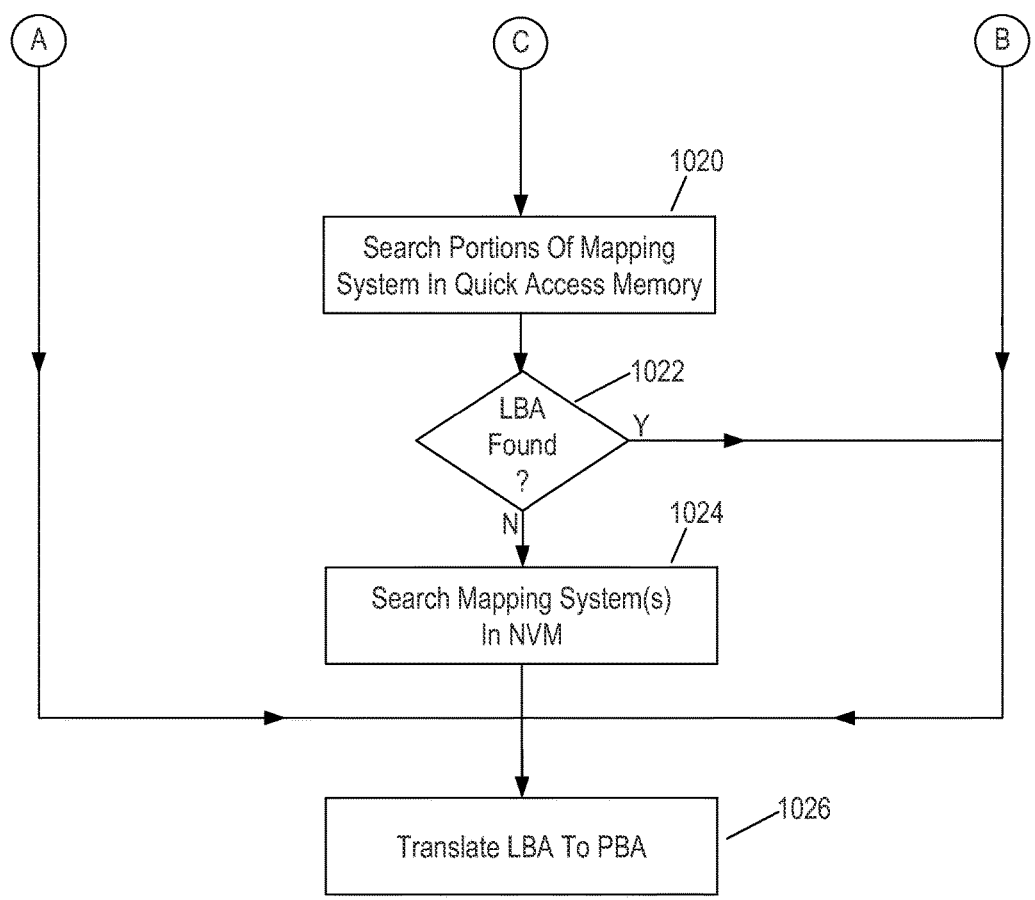
FIG. 10B is a second part of the flowchart of FIG. 10A.

FIGS. 10A and 10B provide a flowchart for an address translation process that can be performed by controller 120 executing firmware 10 according to an embodiment. The process of FIGS. 10A and 10B can be used when there is a need to read or write data stored in DSD 106.

In block 1002, controller 120 receives an LBA for translation to a PBA. This could be for servicing a read or write command received from host 101. In block 1004, controller 120 determines whether host 101 or DSD 106 is in a startup period or if it is soon after a startup period. If not, controller 120 in block 1006 searches a mapping system with a fastest lookup time (e.g., mapping system 14). If the LBA is found in the mapping system in block 1008, controller 120 in block 1026 in FIG. 10B translates the LBA to the PBA identified in the mapping system.

On the other hand, if the LBA is not found in block 1008, controller 120 in block 1010 searches a mapping system with a fastest availability during the startup period (e.g., mapping system 12). Although it is not a startup period, the data to be accessed may still be mapped by the mapping system with the fastest availability during the startup period and this mapping system can have a second fastest lookup time.

In block 1012, controller 120 determines whether the LBA was found in the search of block 1010. If so, the process proceeds to block 1026 in FIG. 10B to translate the LBA to its corresponding PBA. If the LBA was not found in the search of block 1010, the process proceeds to block 1020 in FIG. 10B to search portions of a mapping system that are stored in memory 140 for quicker access.

In block 1022, it is determined whether the LBA was found in the search of block 1020. If so, the LBA is translated to a PBA in block 1026. If not, controller 120 in block 1024 searches one or more mapping systems in NVM 128 (e.g., mapping systems 16 and 18). After locating the LBA in the mapping system, controller 120 translates the LBA to a PBA in block 1026.

Returning to block 1004 in FIG. 10A, the order in which the first two mapping systems are searched is reversed from the order of blocks 1006 and 1010 if it is determined that host 101 or DSD 106 is in a startup period or it is within a predetermined amount of time from a startup period. In block 1014, controller 120 first searches the mapping system with the fastest availability during the startup period (e.g., mapping system 12). In a case where memory 140 is a volatile memory, this can be a mapping system that is restored or loaded into memory 140 the fastest from a non-volatile memory location.

In block 1016, controller 120 determines whether the LBA was found in the search of block 1014. If so, the LBA is translated to a PBA in block 1026 of FIG. 10B. If not, controller 120 in block 1018 searches the mapping system with the fastest lookup time (e.g., mapping system 14) so that the data may become available quicker if mapped by the mapping system with the fastest lookup time.

If the LBA is found in the search of block 1018, controller 120 translates the LBA to a PBA in block 1026 of FIG. 10B. If not, the process proceeds to block 1020 in FIG. 10B to search portions of a mapping system in memory 140. If the LBA is not found in the search performed in block 1020, controller 120 in block 1024 searches the remaining mapping system or systems in NVM 128 to locate the LBA.

Other Embodiments

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a DSP, an ASIC, a FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive and the scope of the disclosure is, therefore, indicated by the following claims rather than by the foregoing description. All changes which come within the meaning and range of equivalency of the claims are to be embraced within their scope.

The invention claimed is:

1. A Data Storage Device (DSD), comprising:
   a memory for storing data; and
   a controller configured to:
      maintain a plurality of mapping systems mapping logical addresses for data stored in the memory to physical addresses for locations in the memory that store the data;
      receive data from a host for storage in the memory;
      store the received data in a location in the memory; and
      select a mapping system from the plurality of mapping systems for mapping the received data based on at least one of a priority level for the received data an indication of how frequently the received data has been or is to be accessed, and when the received data was last accessed, wherein a mapping system that has a fastest lookup time among the plurality of mapping systems is selected for mapping data that has a high priority level, that has been or is to be frequently accessed, or that has been recently accessed.

2. The DSD of claim 1, wherein in selecting the mapping system, the controller uses information provided by the host.

3. The DSD of claim 1, wherein in selecting the mapping system, the controller uses information determined by the DSD.

4. The DSD of claim 1, wherein the controller is further configured to select the mapping system that has the fastest lookup time for mapping data with a low latency access requirement.

5. The DSD of claim 1, wherein the mapping system that has the fastest lookup time requires a least number of memory references to perform a mapping operation as compared to other mapping systems of the plurality of mapping systems.

6. The DSD of claim 1, further comprising a quick access memory that stores the mapping system that has the fastest lookup time.

7. The DSD of claim 1, wherein the mapping system that has the fastest lookup time has a smallest size of the plurality of mapping systems.

8. The DSD of claim 1, wherein the controller is further configured to select a new mapping system of the plurality of mapping systems for mapping data previously mapped by a different mapping system of the plurality of mapping systems based on updated information for the data that is determined by the controller or the host.

9. The DSD of claim 8, wherein the selection of the new mapping system is part of a garbage collection process performed by the controller to reclaim portions of the memory storing invalid data.

10. A method of operating a Data Storage Device (DSD), the method comprising:
    maintaining a plurality of mapping systems mapping logical addresses for data stored in a memory of the DSD to physical addresses for locations in the memory that store the data;
    receiving data from a host for storage in the memory;
    storing the received data in a location in the memory; and
    selecting a mapping system from the plurality of mapping systems for mapping the received data based on at least one of a priority level for the received data, an indication of how frequently the received data has been or is to be accessed, and when the received data was last accessed, wherein a mapping system that has a fastest lookup time among the plurality of mapping systems is selected for mapping data that has a high priority level, that has been or is to be frequently accessed, or that has been recently accessed.

11. The method of claim 10, wherein information provided by the host is used to select the mapping system.

12. The method of claim 10, wherein information determined by the DSD is used to select the mapping system.

13. The method of claim 10, wherein the method further comprises selecting the mapping system that has the fastest lookup time for mapping data with a low latency access requirement.

14. The method of claim 10, wherein the mapping system that has the fastest lookup time requires a least number of memory references to perform a mapping operation as compared to other mapping systems of the plurality of mapping systems.

15. The method of claim 10, wherein the mapping system that has the fastest lookup time is stored in a quick access memory.

16. The method of claim 10, wherein the mapping system that has the fastest lookup time has a smallest size of the plurality of mapping systems.

17. The method of claim 10, further comprising selecting a new mapping system of the plurality of mapping systems for mapping data previously mapped by a different mapping system of the plurality of mapping systems based on updated information for the data that is determined by the controller or the host.

18. The method of claim 17, wherein the selection of the new mapping system is part of a garbage collection process to reclaim portions of the memory storing invalid data.

19. A non-transitory computer readable medium storing computer-executable instructions for operating a Data Storage Device (DSD), wherein when the computer-executable instructions are executed by a controller of the DSD, the computer-executable instructions cause the controller to:
    maintain a plurality of mapping systems mapping logical addresses for data stored in a memory of the DSD to physical addresses for locations in the memory that store the data;
    receive data from a host for storage in the memory;
    store the received data in a location in the memory; and
    select a mapping system from the plurality of mapping systems for mapping the received data based on at least one of a priority level for the received data, an indication of how frequently the received data has been or is to be accessed, and when the received data was last accessed, wherein a mapping system that has a fastest lookup time among the plurality of mapping systems is selected for mapping data that has a high priority level, that has been or is to be frequently accessed, or that has been recently accessed.

20. A Data Storage Device (DSD), comprising:
a memory for storing data; and
a controller configured to:
  maintain a plurality of mapping systems mapping logical addresses for data stored in the memory to physical addresses for locations in the memory that store the data;
  receive a logical address for translation to a physical address;
  determine whether the DSD or a host in communication with the DSD is in a startup period; and select between a mapping system that has a fastest availability during the startup period and a mapping system that has a fastest lookup time among the plurality of mapping systems to search first for translating the received logical address, wherein in response to determining that the DSD or the host is in the startup period, the mapping system that has the fastest availability during the startup period is selected to be searched first.

21. The DSD of claim 20, wherein the mapping system that has the fastest availability during the startup period has a smallest size of the plurality of mapping systems.

22. The DSD of claim 20, wherein the mapping system that has the fastest lookup time requires a least number of memory references to perform a mapping operation as compared to other mapping systems of the plurality of mapping systems.

* * * * *